Patented Sept. 11, 1928.

1,684,272

UNITED STATES PATENT OFFICE.

RICHARD HERZ, OF FRANKFORT-ON-THE-MAIN, AND WERNER ZERWECK, OF FECHEN-HEIM, NEAR FRANKFORT-ON-THE-MAIN, GERMANY, ASSIGNORS TO GRASSELLI DYESTUFF CORPORATION, OF NEW YORK, N. Y., A CORPORATION OF DELAWARE.

DINAPHTHYL-DICARBOXYLIC ACID AND PROCESS OF MAKING SAME.

No Drawing. Application filed June 23, 1926, Serial No. 118,081, and in Germany July 2, 1925.

We have found that dinaphthyl-dicarboxylic acids of the general formula:

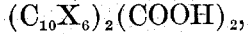

wherein the X's stand for hydrogen atoms, of which one or more may be replaced by a monovalent substituent, are obtained, if the diazo-compounds of aminonaphthoic acids of the general formula:

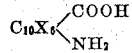

wherein the X's stand for hydrogen atoms, of which one or more may be replaced by a monovalent substituent, are treated with a suitable reducing agent, especially with an ammoniacal solution of cuprous oxide.

Among all the theoretically possible dinaphthyl-dicarboxylic acids the following are already described:

(1) The 1.1'-dinaphthyl-2.2'-dicarboxylic acid, obtained by Kalb (see Berichte d. deutsch. chem. Ges., vol. 47, page 1724) by tetrazotizing 2.2'-diamino-1.1'-dinaphthyl, substituting the two amino groups by cyanogen and saponifying the product thus obtained.

(2) The 1.1'-dinaphthyl-4.4'-dicarboxylic acid, obtained by Seer and Scholl (see Annalen, vol. 398, page 82) by an analogous process, starting from 4.4'-diamino-1.1'-dinaphthyl, and (3) The 1.1'-dinaphthyl-5.5'-dicarboxylic acid, obtained by Seer and Scholl (l. c.) by converting the 1-aminonaphthalene-5-carboxylic acid by the Sandmeyer reaction in the corresponding 1-iodine naphthalene-5-carboxylic acid, esterifying it, treating the ester, thus obtained, with copper powder and finally saponifying.

All these processes are much too complicated to permit the manufacture of the above named compounds on a technical scale.

But according to our new process all theoretically possible dinaphthylcarboxylic acids, their derivatives and nucleal substitution products can be easily manufactured in a pure state with an almost theoretical yield.

They are important intermediates for the production of vat dyestuffs.

The following examples will further illustrate our new process and the products obtained by it. We wish it however to be understood that we are not limited to the particular conditions nor to the specific products mentioned therein. The parts are by weight.

*Example 1.*—187 parts of the 1.8-aminonaphthoic acid (prepared f. i. according to Eckstrand, Journal für prakt. Chimie (2) vol. 38, page 160 or according to Ullmann and Cassirer, (Ber. d. deutsch. chem. Ges. vol. 43, page 440) are diazotized in the usual manner. The difficultly soluble diazo compound separates and is slowly introduced at an ordinary temperature in an ammoniacal solution of cuprous oxide, advantageously prepared as follows:

500 parts of sulfate of copper are dissolved in water, 2400 parts of ammonia of 25 p. c. are added and a current of sulfur dioxide is introduced, until the intensely dark blue liquor is decolorized or feebly reddish colored. Then such an amount of ammonia is added, that the liquor remains ammoniacal until the end of the reaction. The development of nitrogen having ceased, the 1.1'-dinaphthyl-8.8'-dicarboxylic acid of the formula:

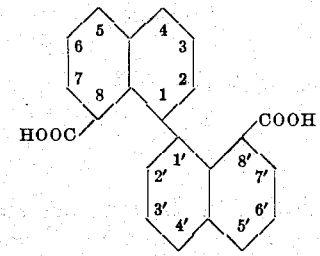

is isolated by acidifying the liquor. It is difficultly soluble in the usual solvents; its melting point is higher than 300° C. It forms easily soluble alkali metal and difficultly soluble heavy metal salts, its magnesium salt is easily soluble. By esterifying it in the usual manner with ethyl alcohol its diethylic ester is formed, melting at 183° C.

The acid is soluble in cold concentrated sulfuric acid with a red color, turning to green when warmed.

The ammoniacal solution of cuprous oxide may be replaced by other suitable reducing agents such as a neutral solution of sodium sulfite or of a ferrous salt.

*Example 2.*—By using in the process described in Example 1 instead of the 1.8-aminonaphthoic acid the corresponding amount of the 2.3-aminonaphthoic acid (prepared f. i. according to Fierz-Tobler, see Helv. Chimica Acta 1922, V, page 557) the 2.2′-dinaphthyl-3.3′-dicarboxylic acid of the formula:

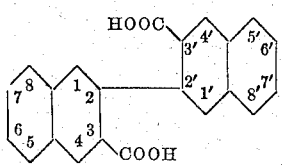

is obtained. It melts at 290–292° C. and is easier soluble in the usual solvents than the previously described isomeric acid.

It dissolves in concentrated sulfuric acid with a red color whereby the dibenzofluorenone-carboxylic acid of the following formula:

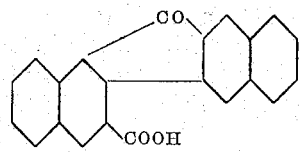

is probably formed.

*Example 3.*—If in the process of Example 1 the 1.8-aminonaphthoic acid is replaced by the corresponding amount of the 1.2-aminonaphthoic acid (prepared f. i. according to Friedländer, Ber. d. deutsch. chem. Ges. vol. 48, page 328) and otherwise the reaction is worked as described above, the corresponding 1.1′-dinaphthyl-2.2′-dicarboxylic acid of the following formula:

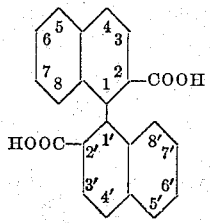

is produced.

It is identical with the acid described by Kalb (l. c.) it melts when crystallized from xylene, at 266° C.; it forms a characteristic easily soluble magnesium salt.

*Example 4.*—The diazo compound prepared from 187 parts of 1.8-aminonaphthoic acid is slowly introduced while stirring in a warm solution of cuprous chloride in diluted sulfuric acid, prepared for instance as follows: 500 parts of copper sulfate are dissolved in water, then 500 parts of common salt and 350 parts of sodium bisulfite solution of 36° Bé. are added. The mass is warmed, until the copper sulfate is reduced and the superfluous sulfur dioxide is driven out. The reaction starts at once and when the development of nitrogen is finished, the 1.1′-dinaphthyl-8.8′-dicarboxylic acid formed separates in the heat. It is filtered and may be purified by redissolving it in an alkaline solution and precipitating it by acidifying. It is identical with the compound, obtained according to Example 1.

*Example 5.*—70 parts of copper sulfate are dissolved in about 300 parts of water, then 190 parts of ammonia solution of 25 p. c. and 120 parts of ferrous sulfate, dissolved in about 300 parts of water are added. To this the diazo compound, prepared in the usual manner from 240 parts of 2.3-aminonaphthoic acid ethylic ester (described by Möhlau, Ber. d. deutsch. chem. Ges. vol. 28, page 3098) is slowly introduced. The reaction starts at once and is finished within a short time. The 2.2′-dinaphthyl-3.3′-dicarboxylic acid diethylic ester, thus formed, separates mixed with ferrous hydroxide. It is purified by extracting the precipitate with dilute acids and, when recrystallized from glacial acetic acid, the ester is obtained in reddish yellow crystals melting at 171° C. By saponifying this ester in the usual manner the 2.2′-dinaphthyl-3.3′-dicarboxylic acid is formed, which is identical with the acid, obtained according to Example 2.

*Example 6.*—500 parts of copper sulfate are dissolved in about 2000 parts of water. Then 500 parts of ammonia of 33 p. c. and an aqueous solution of 210 parts of hydroxylamine hydrochloride and 168 parts of caustic potash are added. To this reducing solution preferably at ordinary temperatures the diazo compound, prepared from 222 parts of the 1-chloro-2-amino naphthalene-3-carboxylic acid, is allowed to run in. This 1-chloro-2-aminonaphthalene-3-carboxylic acid, which was unknown hitherto, may be obtained f. i. from the 1-chloro-2.3-naphthisatine (see German Patent No. 264.265) by treating it according to the reaction, described in German Patent No. 418,009. It forms, when pure, yellow needles, melting at 254° C. When the whole quantity of the diazo compound is introduced and the development of nitrogen ceases, the 1.1′-dichloro-2.2′-dinaphthyl-3.3′-dicarboxylic acid of the formula:

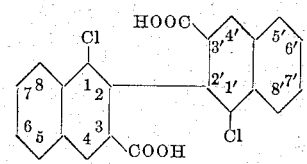

thus produced, is isolated by acidifying the mass. It is obtained in the form of brownish yellow needles, melting at 198°.

By using instead of the above described reducing solution an ammoniacal solution of cuprous oxide, as described in Example 1, the new acid is obtained with the same good yield.

*Example 7.*—169 parts of naphthostyril are sulfonated by warming it with concentrated sulfuric acid. When the sulfonation is finished, the mass is poured on ice and saturated with potassium chloride. The new naphthostyril-sulfonic acid separates in form of its difficulty soluble potassium salt. When warmed f. i. with a caustic soda lye of 10 p. c. it is easily converted into the corresponding sulfonated 1-amino-naphthalene-8-carboxylic acid. For transforming this acid into the corresponding dinaphthyl-disulfo-dicarboxylic acid, it is diazotized and then treated as described in the foregoing examples. It is separated from the solution by acidifying and salting out in the form of its sodium salt. Its chemical formula is probably the following:

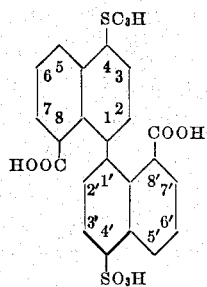

It dissolves in concentrated sulfuric acid with a red color.

It will be noted that the present invention relates to a process of making dinaphthyl-dicarboxylic acids from aminonaphthoic acids and their substitution products, and especially from aminonaphthoic acids in which the amino and carboxyl groups are adjacent to (that is in the ortho or peri positions to) each other.

We do not claim as new products the 1.1′-dinaphthyl-2.2′-dicarboxylic acid, the 1.1′-dinaphthyl-4.4′-dicarboxylic acid and the 1.1′-dinaphthyl-5.5′-dicarboxylic acid, as we are aware, that they are already described in the literature.

We claim:

1. A new process for manufacturing dinaphthyl-dicarboxylic acids of the general formula:

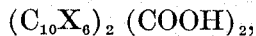

wherein the X's stand for hydrogen atoms of which one or more may be replaced by a monovalent substituent, consisting in treating the diazocompounds of aminonaphthoic acids of the general formula:

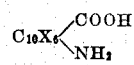

wherein the X's stand for hydrogen atoms, of which one or more may be replaced by a monovalent substituent, with a reducing agent.

2. A new process for manufacturing dinaphthyl-dicarboxylic acids of the general formula:

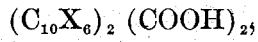

wherein the X's stand for hydrogen atoms, of which one or more may be replaced by a monovalent substituent, consisting in treating the diazocompounds of aminonaphthoic acids of the general formula:

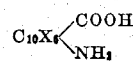

wherein the X's stand for hydrogen atoms, of which one or more may be replaced by a monovalent substituent, with a reducing agent and in isolating the diaphthyl-dicarboxylic acids, thus formed, by acidifying the liquor of reaction.

3. A new process for manufacturing dinaphthyl-dicarboxylic acids of the general formula:

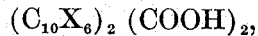

wherein the X's stand for hydrogen atoms, of which one or more may be replaced by a monovalent substituent, consisting in treating the diazocompounds of aminonaphthoic acids of the general formula:

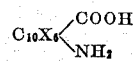

wherein the X's stand for hydrogen atoms, of which one or more may be replaced by a monovalent substituent with an ammoniacal solution of cuprous oxide.

4. A new process for manufacturing dinaphthyl-dicarboxylic acids of the general formula:

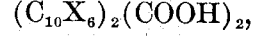

wherein the X's stand for hydrogen atoms, of which one or more may be replaced by a monovalent substituent, consisting in treating the diazocompounds of aminonaphthoic acids of the general formula:

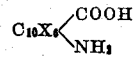

wherein the X's stand for hydrogen atoms, of which one or more may be replaced by a monovalent substituent, with an ammoniacal solution of cuprous oxide, and in isolating the dinaphthyl-dicarboxylic acids, thus formed, by acidifying the liquor of reaction.

5. A new process for manufacturing dinaphthyl-dicarboxylic acids of the general formula $(C_{10}X_6)_2(COOH)_2$, wherein the X's stand for hydrogen atoms of which one or more may be replaced by a monovalent substituent, consisting in treating with a reducing agent the diazocompounds of aminonaphthoic acids of the general formula:

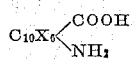

wherein the X's stand for hydrogen atoms, of which one or more may be replaced by a monovalent substituent, and in which the carboxylic and amino group are adjacent to each other.

6. As new products nucleal substituted 1.1'-dinaphthyl-8.8'-dicarboxylic acids of the general formula:

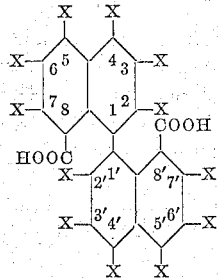

wherein the X's stand for hydrogen atoms, of which at least two are replaced by a monovalent substituent, being highly melting products, soluble in the usual organic solvents, mostly very difficultly soluble in water, soluble in concentrated sulfuric acid with a reddish color, mostly turning to green, when warmed, forming easily soluble alkali metal and magnesium salts and difficultly soluble heavy metal salts, and forming esters when esterified in the usual manner, and being substantially identical with the acids obtainable by treating the diazocompounds of nucleal substituted 1.8-aminonaphthoic acids of the general formula:

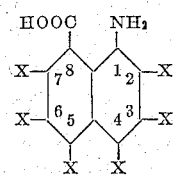

wherein the X's stand for hydrogen atoms, of which at least one is replaced by a monovalent substituent, with a reducing agent.

7. As a new product the 1.1'-dinaphthyl-8.8'-dicarboxylic acid of the formula:

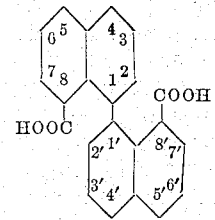

of which the melting point is higher than 300° C., which is insoluble in water, soluble in the usual organic solvents and soluble in cold concentrated sulfuric acid with a red color turning to green, when warmed, forming easily soluble alkali metal and magnesium salts and difficultly soluble heavy metal salts and forming a diethylic ester, melting at 183° C., when esterified in the usual manner with alcohol, and being substantially identical with the product obtainable by treating the diazo compound of the 1.8-aminonaphthoic acid with a reducing agent.

8. A new process for manufacturing dinaphthyl-dicarboxylic acids of the general formula $(C_{10}X_6)_2 (COOH)_2$, wherein the X's stand for hydrogen atoms of which one or more may be replaced by a monovalent substituent, consisting in treating the diazocompounds of aminonaphthoic acids of the general formula:

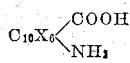

wherein the X's stand for hydrogen atoms, of which one or more may be replaced by a monovalent substituent, and in which the carboxylic and amino group are adjacent to each other, with an ammoniacal solution of cuprous oxide and in isolating the dinaphthyl-dicarboxylic acids, thus formed, by acidifying the solution thus obtained.

In testimony whereof, we affix our signatures.

RICHARD HERZ.
WERNER ZERWECK.